United States Patent
Goel et al.

(10) Patent No.: US 10,178,194 B2
(45) Date of Patent: Jan. 8, 2019

(54) INTELLIGENT NOTIFICATIONS TO DEVICES WITH MULTIPLE APPLICATIONS

(71) Applicant: ADOBE SYSTEMS INCORPORATED, San Jose, CA (US)

(72) Inventors: Sourabh Goel, New Delhi (IN); Gaurav Modi, Patiala (IN); Amit Batra, Noida (IN)

(*) Notice: Subject to any disclaimer, the term of this patent is extended or adjusted under 35 U.S.C. 154(b) by 467 days.

(21) Appl. No.: 14/881,835

(22) Filed: Oct. 13, 2015

(65) Prior Publication Data
US 2017/0104835 A1   Apr. 13, 2017

(51) Int. Cl.
| | | |
|---|---|---|
| G06F 15/16 | (2006.01) | |
| H04L 29/08 | (2006.01) | |
| H04L 12/58 | (2006.01) | |
| H04W 68/00 | (2009.01) | |
| H04W 4/00 | (2018.01) | |

(52) U.S. Cl.
CPC ........... *H04L 67/26* (2013.01); *H04L 51/00* (2013.01); *H04W 68/00* (2013.01); *H04W 4/00* (2013.01)

(58) Field of Classification Search
CPC ........ H04L 67/26; H04L 51/00; H04W 68/00; H04W 4/00
See application file for complete search history.

(56) References Cited

U.S. PATENT DOCUMENTS

| | | | | |
|---|---|---|---|---|
| 6,999,992 | B1* | 2/2006 | Deen | H04L 41/0896 709/202 |
| 7,546,350 | B2* | 6/2009 | Deen | H04L 41/0896 709/202 |
| 8,694,916 | B2* | 4/2014 | Sohn | H04M 1/72547 715/808 |
| 8,924,489 | B2* | 12/2014 | Bleau | H04L 67/26 709/206 |
| 9,015,641 | B2* | 4/2015 | Bocking | G06F 3/017 715/863 |
| 9,292,310 | B2* | 3/2016 | Chaudhri | G06F 9/4443 |
| 9,507,608 | B2* | 11/2016 | Chaudhri | G06F 9/4443 |
| 9,537,812 | B2* | 1/2017 | Lewis | H04L 51/24 |
| 9,609,115 | B2* | 3/2017 | Cho | H04M 1/72547 |
| 9,766,802 | B2* | 9/2017 | Bocking | G06F 3/04883 |
| 9,774,697 | B2* | 9/2017 | Li | H04L 67/26 |

(Continued)

*Primary Examiner* — Moustafa M Meky
(74) *Attorney, Agent, or Firm* — Shook, Hardy & Bacon, L.L.P.

(57) ABSTRACT

Notifications are provided intelligently to reduce the number of messages displayed for a notification received by multiple applications. When an originating notification intended for a particular end user is received at a notification server, applications associated with that end user and registered for that type of notification are identified. The identified applications are grouped by device identifier. A subset of a single or a few target applications is selected for each group, while all other applications are considered as non-target applications. A notification for each target application is generated with a notification payload set to display a message, while a notification for each non-target application is generated with a notification payload set not to display a message. As such, when a user device receives multiple notifications for the same originating notification, the user device displays messages only for a single target application or a few target applications.

20 Claims, 5 Drawing Sheets

(56) References Cited

U.S. PATENT DOCUMENTS

2006/0085514 A1\* 4/2006 Deen ................... H04L 41/0896
709/206
2015/0188871 A1\* 7/2015 Lewis .................... H04L 51/24
709/207

\* cited by examiner

INTELLIGENT NOTIFICATIONS TO DEVICES WITH MULTIPLE APPLICATIONS

BACKGROUND

There is a plethora of applications available for mobile devices in the market. More and more of these applications are using notifications, often referred to as "push notifications," to engage end users by pushing information to them and potentially bringing the end users back to the applications. For instance, notifications allow any application running in the background to notify the end user of some activity and lure him/her back to its interface. As such, notifications have the potential to increase an application's usage multifold.

In some cases, end users have multiple applications on a user device that are registered to receive the same type of notification. Currently, when a notification server receives an originating notification, the notification server sends a notification to each application registered to receive that type of notification. This presents a problem as a message is displayed for each of the notifications such that multiple messages for the same originating notification are displayed on the user device. For instance, when two email applications are registered to receive notifications for incoming email messages, two messages are displayed each time an incoming email message is received. Having multiple messages displayed for the same originating notification is often annoying to end users. The only current solution to this problem is to give the end user the option to completely turn off notifications for an application.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to handling a notification at a notification server such that when multiple applications on the same user device are registered to receive that type of notification, a message is not displayed for all the applications. An originating notification identifying a user identifier and a notification type is received at a notification server. Applications registered for the notification type and associated with the user identifier are identified. The applications are grouped based on device identifier, with each device identifier being associated with a different user device. For each device identifier, an application registered for the notification type is selected as a target application. All other applications registered for the notification type for that device identifier are considered as non-target applications. A notification is generated for each target application to have a notification payload set to display a message for the notification. A notification is generated for each non-target application to have a notification payload set to not display a message for the notification. The notifications are communicated over a communications network to one or more user devices.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

It is currently not uncommon for multiple applications on a user device to be registered to receive the same type of notification. For example, an end user may have two email applications that both receive notifications when an email is received. As another example, some application developers offer applications that provide end users with an integrated workflow across different applications, which leads to different applications on the same device being registered to receive the same type of notification. By way of specific example to illustrate, both the ADOBE ILLUSTRATOR DRAW and the ADOBE PHOTOSHOP MIX applications may be registered to receive notifications in the event of a creative asset being added to the end user's creative cloud account. Currently, when multiple applications on the same user device are registered to receive the same type of notification, each application receives a notification and displays a message (e.g., toast messages) for the same originating notification. This results in redundant messages being displayed for the same originating notification, which is annoying to the end user. For instance, in the example of two email applications being registered to receive a notification when an email is received, two messages are displayed on the user device each time an email is received. In the example of the ADOBE ILLUSTRATOR DRAW and the ADOBE PHOTOSHOP MIX applications from above, two messages would be displayed on the user device each time a creative asset is added to the end user's account.

Accordingly, embodiments of the present disclosure address these new technological problems introduced by notification services by providing solutions for displaying only a single message (or a few messages) on a user device when multiple applications on that user device are registered to receive the same type of notification. In accordance with embodiments of the present invention, when each application registers with a notification server, the application provides, among other things, a device identifier identifying a user device on which the application is installed. When an originating notification intended for a particular end user is received at the notification server, the notification server identifies applications associated with that end user that are registered to receive that type of notification. The identified applications are grouped according to device identifier. Each group includes applications installed on a particular user device that are registered to receive that type of notification. An application is selected for each group as a target application for that group, while all other applications from the group are considered to be non-target applications. In some embodiments, only a single target application is selected for a group, while in other embodiments, a few target applications are selected. As will be discussed in further detail herein, the target application may be selected based on different factors, such as usage and/or priority associated with each application. A notification is generated for each target application to include a notification payload set to display a message, while a notification is generated for each non-target application to include a notification payload set not to display a message. The notifications are then communicated from the notification server to the appropriate user devices. As such, when a user device receives multiple notifications for the same originating notification, only the notification for a target application includes a notification payload set to display a message. All other notifications include a notification payload set not to display a message. Accordingly, although the user device receives multiple notifications for the same originating notification, message(s) are only displayed for notifications directed to the target application(s).

Figure 1:
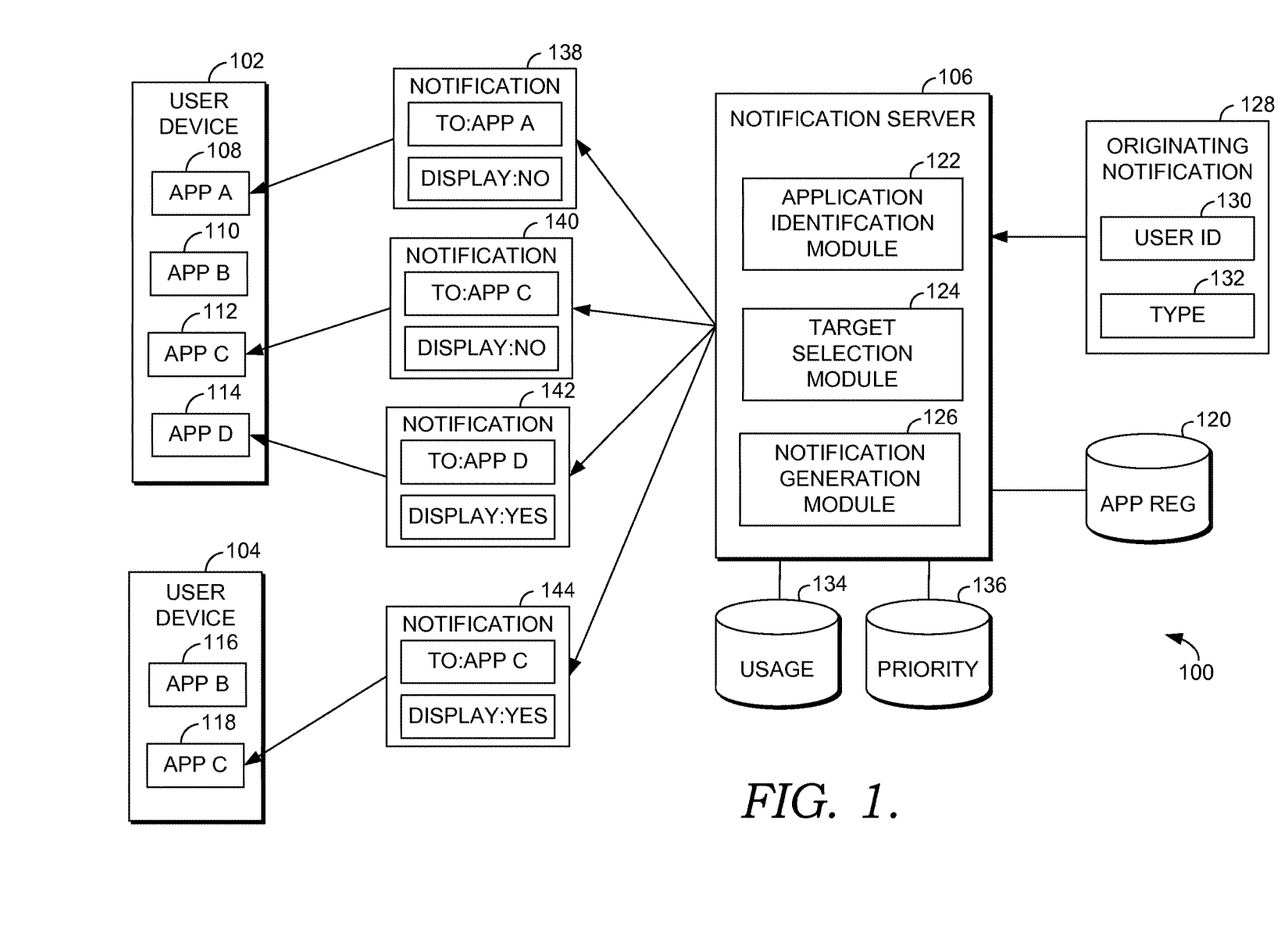
FIG. 1 is a block diagram of an exemplary system architecture in which embodiments of the invention may be employed.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 includes a number of user devices, including user device 102 and user device 104, and notification server 106. Each of the components shown in FIG. 1 may be implemented via any type of computing device, such as computing device 700 described with reference to FIG. 7, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of user devices and notification servers may be employed within the system 100 within the scope of the present invention. Each may comprise a single device or multiple devices cooperating in a distributed environment. For instance, the notification server 106 may be provided via multiple devices arranged in a distributed environment that collectively provide the functionality described herein. Additionally, other components not shown may also be included within the network environment.

As will be described in further detail below, the system 100 generally operates to deliver notifications to multiple applications on user devices, such as the user devices 102 and 104, such that only a single message or only a few messages are displayed on each user device. To receive notifications, applications on a user device (e.g., application A 108, application B 110, application C 112, and application D 114 on the user device 102, and application B 116 and application C 118 on the user device 104) initially register with the notification server 106. An application registers with the notification server 106 using a registration call and provides registration information for the application. Different registration information is provided depending on the platform being used. The registration information may include, for instance: a user identifier of the logged-in user; a device identifier that uniquely identifies the device on which the registering application is running; an application identifier (e.g., bundleID on iOS devices or packagename on ANDROID devices); a target identifier (an identifier created from deviceToken on iOS devices or registrationID on ANDROID devices); and an access token for validation.

In some embodiments, the registration information also specifies one or more types of notifications to provide to an application. In other embodiments, however, the notification server 106 stores information identifying the types of notifications to provide to different applications such that the registration information does not need to include such information. In any of these various embodiments, this is referred to herein as the application being registered to receive a type of notification. In some embodiments, the type of notification may be identified by a type/subtype pair.

Although any of a variety of different information may be used as a device identifier on various operating systems, the following provides some specific examples. On iOS devices, deviceToken uniquely identifies a device and can be used as the device identifier. On ANDROID devices, there are two parameters that can be used to identify the device identifier: deviceID received from TelephonyManager; or ANDROID_ID. The deviceID from TelephonyManager is present in instances in which the device has phone calling enabled. The deviceID may be a hardware serial number, if available. The ANDROID_ID is a 64-bit number (as a hex string) that is randomly generated when a user first sets up an ANDROID device and should remain constant for the lifetime of the user's device, although the value may change if a factory reset is performed on the device. When a device has multiple users (available on certain devices running ANDROID 4.2 or higher), each user appears as a completely separate device, so the ANDROID_ID value is unique to each user. Some embodiments use a combination of these two values to determine a unique device identifier. For instance, below is a snapshot of a function in Java to fund a unique device identifier for an ANDROID device:

```
final TelephonyManager tm = (TelephonyManager)
    getBaseContext( ).getSystemService(Context.
    TELEPHONY_SERVICE);
final String tmDevice, androidId;
//get telephony manager deviceID if available
tmDevice = "" + tm.getDeviceId( );
//get ANDROID_ID value
androidId = "" +
    android.provider.Settings.Secure.
    getString(getContentResolver( ),
    android.provider.Settings.Secure.ANDROID_ID);
UUID deviceUuid = new UUID(androidId.hashCode( ),
    ((long)tmDevice.hashCode( ) << 32));
String uID = deviceUuid.toString( );
return uID;
```

An application registration call to the notification server 106 is typically made each time an application is launched on a user device, among other times such as on access token expiry. The first time an application registers with the notification server 106, the notification server 106 stores registration information in an application registration database 120 such that the information can be used when pushing notifications to the application. The registration information may be stored, for instance, as: {user identifier; application identifier; target identifier; and device identifier}.

When a registration call is made by an application that has already been registered, it is not necessary to re-store registration information. However, in accordance with embodiments of the present invention, a registration count value is incremented each time the registration call is made by the application. Because the registration call is made whenever the application is launched, this registration count reflects the usage of the application by the end user. As such, the registration count is used in some embodiments to select a target application as will be discussed in further detail below.

After an application has been registered with the notification server 106, notifications may be pushed to the application by the notification server 106. For instance, as shown in FIG. 1, an originating notification 128 is received at the notification server 106. Among other things, the originating notification 128 contains the following information: a user identifier 130 of the end user to whom the notification is to be pushed; and a notification type 132 (which may be provided as a type/subtype pair).

When receiving an originating notification, an application identification module 122 on the notification server 106 operates to identify applications registered for the notification type and associated with the user identifier identified by the originating notification. This identification is performed by accessing registration information stored by the application registration database 120. For instance, upon receiving the originating notification 128, the application identification module 122 queries the application registration database 120 for applications registered for the user identifier 130 to receive notifications of the notification type 132. In some embodiments, the application identification module 122 first identifies all applications associated with the user identifier contained in the originating notification and then identifies, from those applications, which applications are registered for the notification type.

In the example shown in FIG. 1, an end user has two user devices 102, 104. The user device 102 includes application A 108, application B 110, application C 112, and application D 114. The user device 104 includes application B 116 and application C 118. Application B 110 on the user device 102 and application B 116 on the user device 104 are instances of the same application (e.g., each could be instances of an email application). Likewise, application C 112 on the user device 102 and application C 118 on the user device 104 are instances of another application (e.g., each could be instances of a photo editing application). In the present example, application A 108, application C 112, and application D 114 on the user device 102 are registered to receive notifications of the notification type 132. Application C 118 on the user device 104 is also registered to receive notification of the notification type 132. As such, when the notification server 106 receives the originating notification 128, the application identification module 122 queries the application registration database 120 to identify application A 108, application C 112, application D 114, and application C 118 as being associated with the user identifier 130 and the notification type 132 identified by the originating notification 128.

When multiple applications residing on a given user device are registered to receive a particular type of notification, a notification is pushed to each of those applications in response to an originating notification. However, in accordance with embodiments of the present invention, only a subset of one or more applications on a user device is selected as a target application that receives a notification that causes the display of a message (e.g., a toast message). In some embodiments, only a single target application is selected, while in other embodiments, a few target applications may be selected for a given user device. All other non-target applications receive a notification that does not result in the display of a message. This reduces the number of messages displayed to a single message or only a few messages despite multiple applications receiving the same notification on the user device.

Accordingly, the target selection module 124 operates to identify an application on each user device as a target application. All other applications are considered to be non-target applications. The target selection module 124 groups the applications registered for the notification type and user identifier of an originating notification according to device. In particular, the device identifier stored in the registration information database with each registered application is used to sort the applications. For instance, in the example of FIG. 1, application A 108, application C 112, application D 114, and application C 118 have been identified as being associated with the user identifier 130 and the notification type 132 identified by the originating notification 128. The target identification module 124 groups those applications based on the device identifier associated with each application. Application A 108, application C 112, and application D 114 are associated with a first device identifier for the user device 102 and are accordingly grouped together. Application C 118 is associated with a second device identifier for the user device 104 and is placed in a separate group.

After grouping the applications according to device identifiers, the target selection module 124 selects an application from each group as a target application. An application may be selected as a target application in a number of different manners in accordance with various embodiments of the present invention. In one embodiment, a target application is selected based on usage of the applications. Thus, the message is displayed in associated with the application the end user most frequently uses. The usage may be based on the registration count that is incremented each time an application is registered. This usage may be stored in the application registration database 120 or a separate usage data store 134. To select a target application, the target selection module accesses the usage information for each application grouped together, and the application with the highest usage is selected as the target application. For instance, for the user device 102, suppose that application D 114 has a higher usage than application A 108 and application C 112. Given that application D 114 has the highest usage in the group, application D 114 is selected as the target application for that group.

In other embodiments, a target application is selected based on priority information prioritizing the applications. In some instances, the priority information is a global priority list prioritizing a number of different applications. In other embodiments, a per notification priority list is used that prioritizes applications for a given type of notification (e.g., multiple per notification priority lists could be provided for the various types of notifications available). The priority information may be created by the end user (e.g., a personal priority list), an application developer, or other entity. Priority information is stored by the notification server 106, for instance, in a priority data store 136. To select a target application, the target selection module 124 accesses priority information from the priority data store 136. If a per notification priority list is available for the given type of notification, the per notification priority list is accessed. If a per notification priority list is not available, a global priority list is accessed. The application with the highest priority in the accessed priority list is selected as the target application. For instance, suppose that an accessed priority list provides a higher priority for application D 114 than the priority for application A 108 and application C 112. Accordingly, application D 114 would be selected as the target application for the group.

In still another embodiment, the target selection module 124 selects a target application as a function of usage and priority. In particular, a usage value and a priority weight value is retrieved, for instance, from the usage data store 134 and priority data store 136, for each application grouped based on device identifier. The usage value for an application may be based on the number of registration counts. The priority weight values may be from a global priority list or a per notification priority list. If a per notification priority list is available, priority weightings from that list are used. If a per notification priority list is not available, priority weights from a global priority list are used. Accordingly, the priority of an application for an end user on a device (Paud) is calculated as follows:

| | |
|---|---|
| Paud = RegCount * Pan | if Pan exists |
| Paud = RegCount * Pag | otherwise |

Where RegCount represents the registration count for the application, Pan represents the priority weighting of the application based on a notification type, and Pag is the priority weight of the application from a global priority list. For a given originating notification, the priority values calculated for each application are used to select the target application. For instance, the application with the highest priority value is selected as the target application, while all other applications are considered to be non-target applications. By way of illustration, in the example of FIG. 1, the priority value calculated for application D 114 may be determined to be greater than the priority value calculated for application A 108 and application C 112. As such, application D is selected as the target application.

In instances in which there is only a single application associated with a particular device identifier that is registered for the notification type, that application is set as the target application. For instance, in the example of FIG. 1, application C 118 is the only application registered for the notification type 132 associated with the device identifier for the user device 104. Accordingly, application C 118 is selected as the target application for that device identifier.

In some embodiments, the target selection module 124 selects a target application, for instance, as a function of usage and/or priority, at runtime after an originating notification has been received. In other embodiments, the target selection module 124 selects a target application "offline" and independent of any originating notification. For instance, the target selection module 124 may select a target application for a device identifier and a notification type and store that information. As such, when an originating notification of that notification type is received by the notification server 106, the stored information may simply be accessed to lookup the target application for each device identifier.

The notification generation module 126 generates a notification to be sent to each application registered to receive the notification type of an originating notification. For each target application, the notification generation module 126 generates a notification with a notification payload set to display a message for the notification. For instance, the notification payload may include a parameter set to display a message for the notification. For all other applications (i.e., non-target applications), the notification generation module 126 generates a notification with a notification payload set to not display a message for the notification. For instance, the notification payload may include a parameter set to not display a message for the notification. The parameter added to the notification payload may depend on the platform being used. By way of example, for ANDROID devices, the parameter "silent:false" is added to the notification payload for the target application, and the parameter "silent:true" is added to the notification payload for the other applications. For iOS devices, silent notifications are provided through a "content-available" parameter in the notification payload. Accordingly, this parameter is set depending on whether the notification is being provided to a target application or non-target application.

In the example of FIG. 1, application D 114 has been identified as the target application for user device 102. As such, a notification 142 is generated and sent to the user device 102 that includes a display parameter set to display a message. Application A 108 and application C 112 are non-target applications. Therefore, the notifications 138 and 140 generated and sent for these applications have parameters set to not display a message for those notifications. Because application B 110 is not registered to receive notifications of the notification type 132, no notification is generated and sent for application B 110.

For the user device 104, only application C 118 is registered to receive a notification of the notification type 132. Therefore, a notification 144 is generated and sent to the user device 104 for application C 118 with a notification payload having a display parameter set to display a message for the notification. Because application B 116 is not registered to receive notifications of the notification type 132, no notification is generated and sent for application B 116.

The notifications are pushed to applications via the platform vendor specific mechanism. These mechanisms are well known and therefore will not be described in further detail herein.

When notifications are received on user devices, the notification payloads control whether a message (e.g., a toast message) is displayed. In the example of FIG. 1, notification 142 includes a parameter to display a message and therefore causes the user device 102 to display a message. However, notifications 138 and 140 do not include a parameter to display a message. Therefore, the notifications 138 and 140 are provided to application A 108 and application C 140, respectively, without a message being displayed. Additionally, notification 144 includes a parameter to display a message and causes the user device 104 to display a message.

The specific handling of notifications on user devices depends on the platform. For example, on ANDROID devices, the notifications are provided to the applications. Each application checks the notification payload. If the notification payload has a parameter "silent:true", then the notification is handled silently by not displaying a message. If the notification payload doesn't have "silent" value or has "silent:false", then a toast message is displayed. On iOS devices, if the notification payload indicates a silent notification via the "content-available" parameter, the notification is forwarded to the application without showing any message. If the notification payload indicates that the notification is not silent, a message is displayed by the user device, and the notification is forwarded to the application for further processing.

Figure 2:
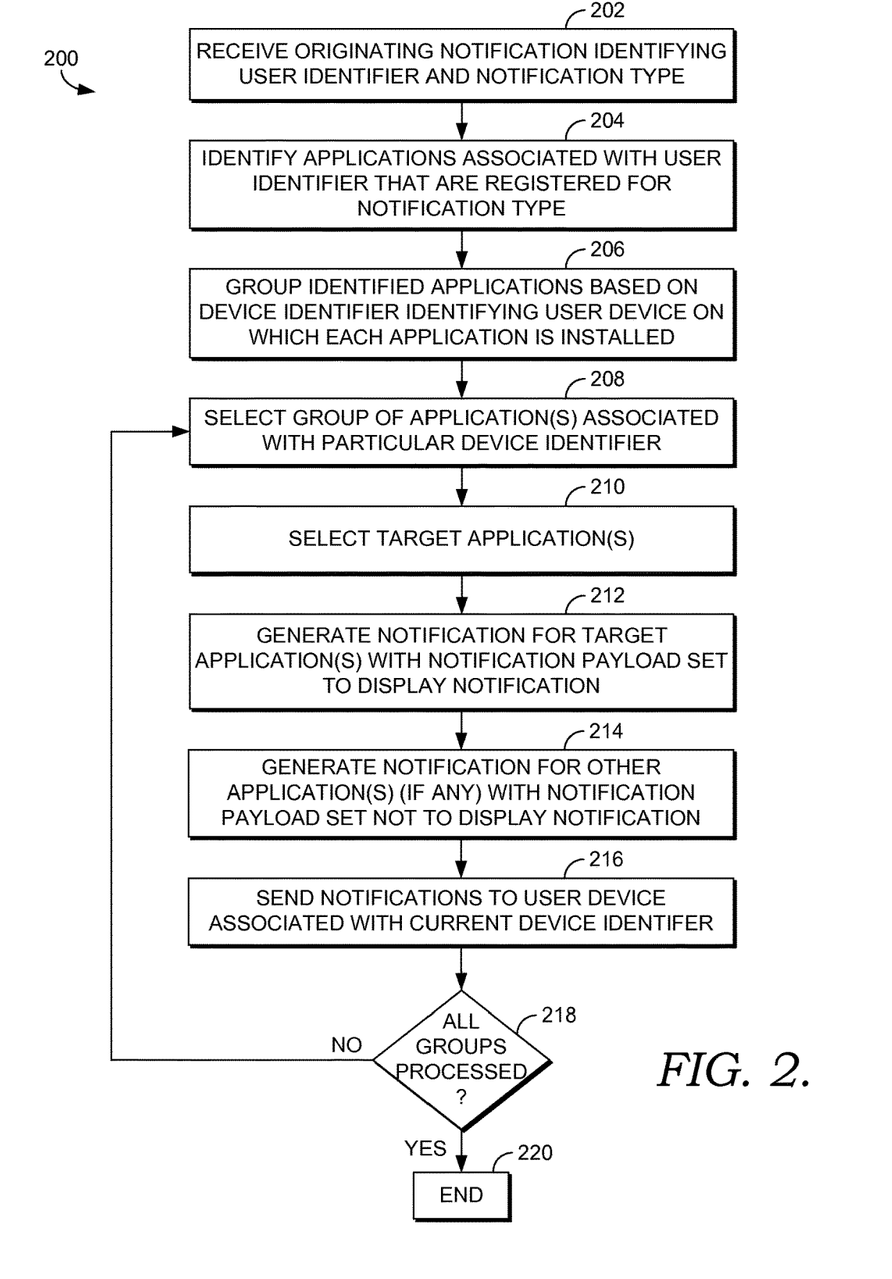
FIG. 2 is a flow diagram showing method for generating notifications to different applications for the same originating notification in accordance with an embodiment of the present invention.

With reference now to FIG. 2, a flow diagram is provided that illustrates a method 200 for generating notifications at a notification server for delivery to user devices. Each block of the method 200 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be performed using a computing device, such as the computing device 700 of FIG. 7.

As shown at block 202, an originating notification is received at the notification server. The originating notification may originate from any of a variety of different sources. Among other things, the originating notification identifies a particular user identifier for the end user to whom the notification is to be delivered. Additionally, the originating notification identifies itself as being a particular notification type.

Applications associated with the user identifier that are registered to receive notifications of the notification type are identified, as shown at block 204. This may include querying an application registration database, such as the application registration database 120 of FIG. 1. The identified applications are grouped according to device identifiers, which identify the user device on which each application is installed, as shown at block 206. As such, each group includes all applications on a corresponding user device that are registered to receive notifications of the identified notification type.

A group of one or more applications associated with a particular device identifier are selected at block 208. An application from the group is selected as a target application, as shown at block 210. In the event that only a single application is associated with a particular device identifier, that application is set as the target application. However, if multiple applications associated with a particular device identifier are registered to receive notifications of the identified notification type, one of the applications is selected as the target application, for instance, based on usage alone, priority alone, or as a function of usage and priority, as discussed in further detail herein. In some embodiments, more than one application is selected as a target application for a given device identifiers. The number of target applications selected for a given device identifier may be configurable.

A notification is generated for the target application with a notification payload set to display a message for the notification, as shown at block 212. This may include, for instance, setting a parameter to display a message regarding the notification. Additionally, a notification is generated for all other applications (i.e., non-target applications), if any, with a notification payload set not to display the notifications, as shown at block 214. The notifications are then sent to the user device associated with the current device identifier, as shown at block 216.

A determination is made at block 218 regarding whether all application groups have been processed. If not, the process of blocks 208 through 216 is performed for a next group of application(s) associated with another device identifier. The process is repeated for each device identifier group. When a determination that all device identifier groups have been completed, the process ends at block 220. It should be understood that while FIG. 2 illustrates a process in which device identifier groups are processed serially, it should be understood that other approaches, such as processing the device identifier groups in parallel, are within the scope of embodiments of the present invention.

Figure 3:
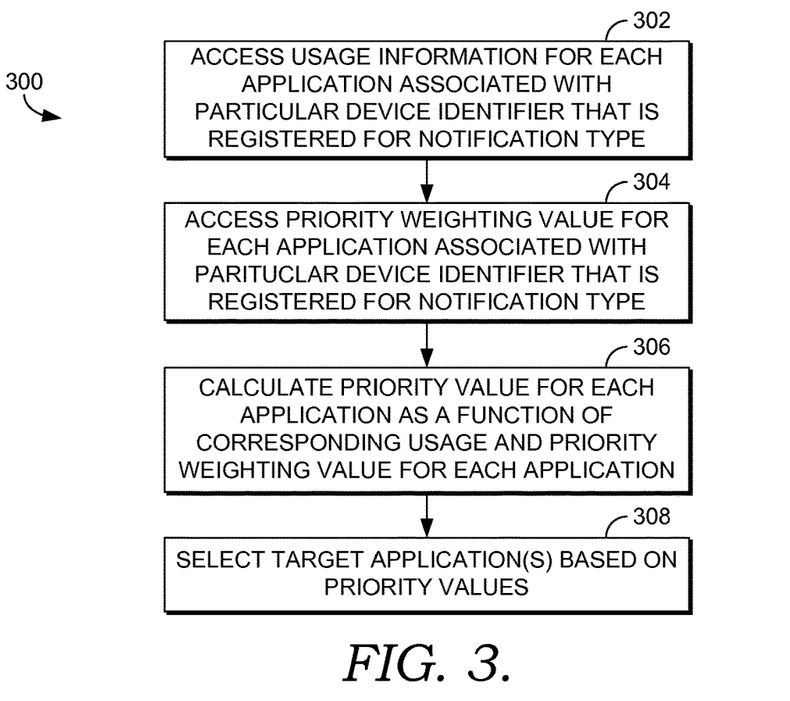
FIG. 3 is a flow diagram showing a method for selecting a target application as a function of usage and priority in accordance with embodiments of the present invention.
Figure 4:
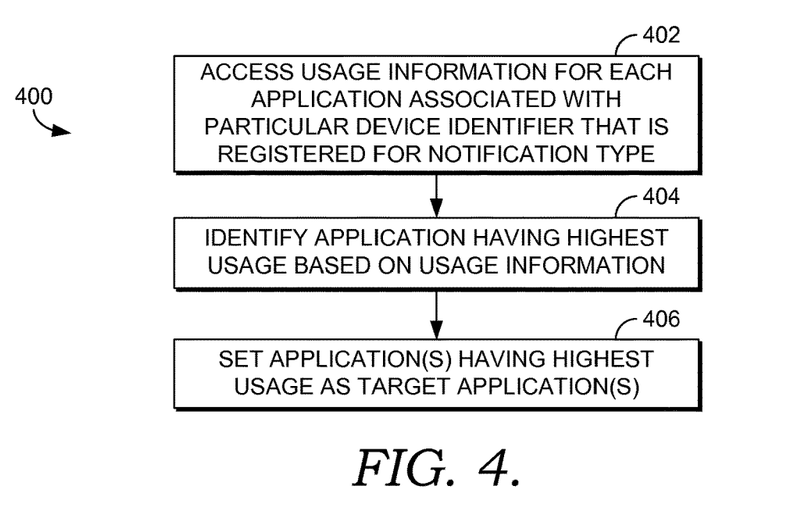
FIG. 4 is a flow diagram showing a method for selecting a target application base on usage alone in accordance with embodiments of the present invention.
Figure 5:
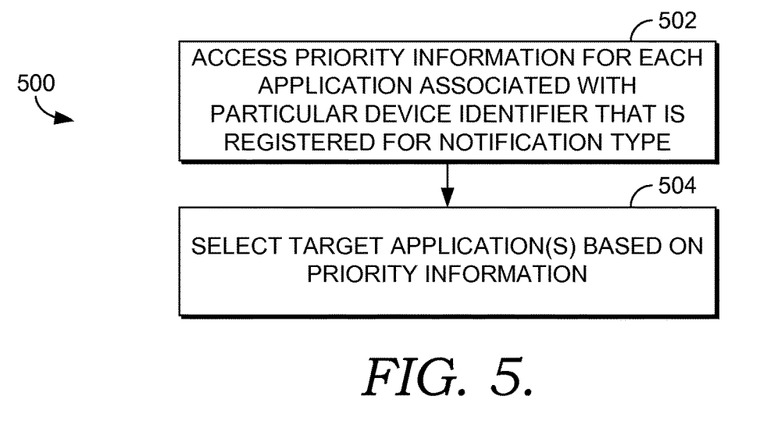
FIG. 5 is a flow diagram showing a method for selecting a target application as a function of priority alone in accordance with embodiments of the present invention.

FIGS. 3-5 provide flow diagrams illustrating example methods for identifying a target application that can be performed, for instance, at block 210 of FIG. 2. Initially, FIG. 3 illustrates a method 300 for selecting a target application as a function of usage and priority. As shown at block 302, usage information is accessed for each application associated with a particular device identifier that is registered for an identified notification type. In some embodiments, the usage information for each application is based on a registration count that reflects the number of times each application has made a registration call.

Priority weighting values are also accessed for each application, as shown at block 304. The priority weighting values may be accessed from a global priority list or from a per notification priority list that provides weighting values based on the notification type. The priority weighting values may be set by end user (e.g., a personal priority list), an application developer, or other entity.

A priority value is calculated for each application as a function of a corresponding usage value and weighting value for each application, as shown at block 306. An application is selected as a target application at block 308 based on the priority values calculated for the applications. For instance, in an embodiment, the application having the highest calculated priority value is selected as the target application. In some embodiments, only a single application is selected as a target application for a given device identifier. In other embodiments, multiple applications can be selected as target applications for a given device identifier.

FIG. 4 illustrates a method 400 for selecting a target application as a function of usage alone. As shown at block 402, usage information is accessed for each application associated with a particular device identifier that is registered for an identified notification type. In some embodiments, the usage information for each application is based on a registration count that reflects the number of times each application has made a registration call. The application having the highest usage based on the usage information is identified, as shown at block 404. The application identified as having the highest usage is set as the target application, as shown at block 406. In some embodiments, more than one application may be set as the target application based on those applications having the highest usage.

FIG. 5 illustrates a method 500 for selecting a target application as a function of priority alone. As shown at block 502, priority information is accessed for each application associated with a particular device identifier that is registered for an identified notification type. As noted previously, the priority information may be set by an end user (e.g., a personal priority list), an application developer, or other entity. An application is selected as a target application based on the priority information, as shown at block 504. For instance, in one embodiment, the priority information provides priority weighting values, and the application with the high priority weighting value is selected as the target application. In another embodiment, the priority information simply lists applications from highest to lowest priority, and the application with the highest priority based on its location in the list is selected as the target application. In some embodiments, more than one applications may be selected as a target application for a given device identifier.

Figure 6:
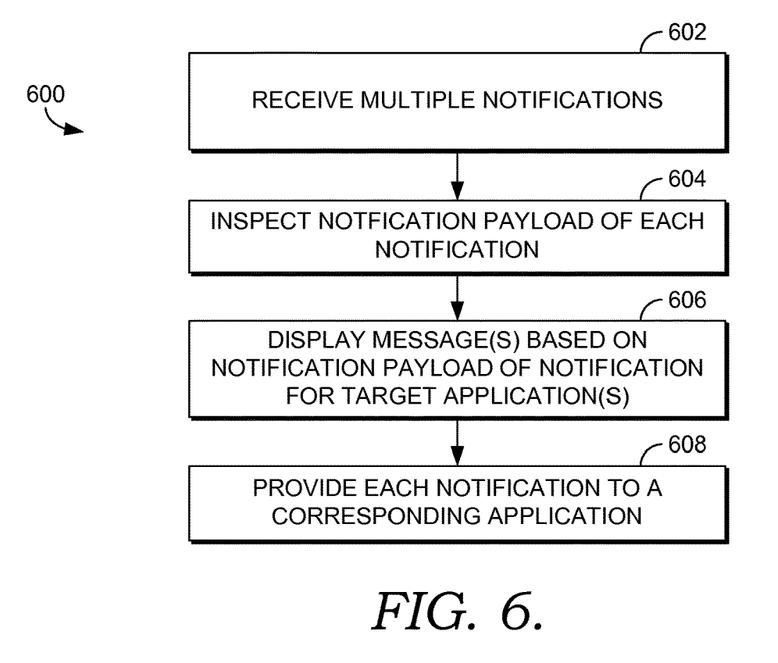
FIG. 6 is a flow diagram showing a method for handling notifications on a user device in accordance with embodiments of the present invention.

When notifications are sent to a user device for a particular originating notification, the notifications may be handled by the user device as illustrated by the method 600 in the flow diagram of FIG. 6. As shown at block 602, the user device receives multiple notifications corresponding with the same originating notification. Each notification is addressed to a different application on the user device. The notification payload of each notification is inspected, as shown at block 604. Because the notification server sending the notifications has set a display parameter to display a message for only one notification corresponding with a target application, only a single message is displayed, as shown at block 606. In embodiments in which multiple target applications are selected for the user device, multiple messages are displayed at block 606 for those target applications. Additionally, each notification is provided to its intended application, as shown at block 608.

Figure 7:
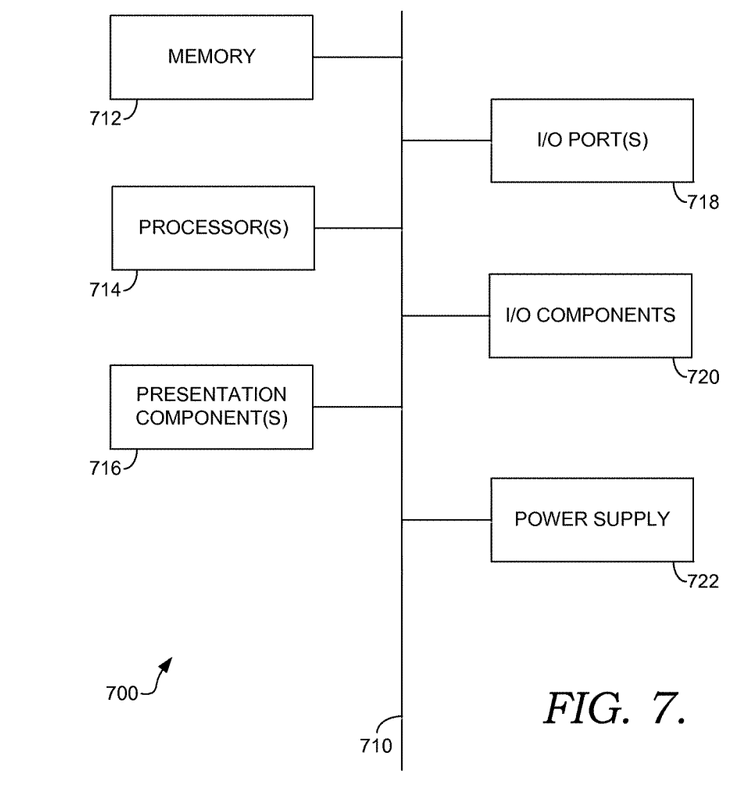
FIG. 7 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention are generally directed to providing the same notification to multiple applications on a user device in a manner in which only a single message is displayed for the notification for a target application. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
receiving, at a server, an originating notification identifying a user identifier and a notification type;
identifying applications registered for the notification type and associated with the user identifier;
grouping the applications registered for the notification type based on device identifier, each device identifier being associated with a different user device;
for each device identifier, selecting a single application registered for the notification type as a target application based on a function of usage information of the applications registered for the notification type and respective weighting values of the applications in a priority list;
generating a notification for each target application to have a notification payload set to display a message for the notification; and
communicating the notifications over a communications network to one or more user devices, wherein the one or more user devices display a message for the notification for each target application.

2. The one or more computer storage media of claim 1, wherein identifying the applications registered for the notification type associated with the user identifier comprises:
identifying a group of applications associated with the user identifier; and
identifying, from the group of applications associated with the user identifier, a subset of applications registered for the notification type.

3. The one or more computer storage media of claim 1, wherein selecting the single application registered for the notification type as the target application for a given device identifier comprises:
accessing usage information for each application registered for the notification type and associated with the given device identifier;
identifying an application having the highest usage based on the usage information; and
setting the application having the highest usage as the target application for the given device identifier.

4. The one or more computer storage media of claim 1, wherein selecting the single application registered for the notification type as the target application for a given device identifier comprises:
accessing usage information for each application registered for the notification type and associated with the given device identifier;
accessing priority information providing a weighting value for each application registered for the notification type and associated with the given device identifier;
calculating a priority value for each application registered for the notification type and associated with the given device identifier based on corresponding usage information and weighting values; and
selecting an application as the target application based on the priority values calculated for the applications registered for the notification type and associated with the given device identifier.

5. The one or more computer storage media of claim 4, wherein the priority information provides weighting values irrespective of notification type.

6. The one or more computer storage media of claim 4, wherein the priority information provides weighting values based on notification type.

7. The one or more computer storage media of claim 1, wherein selecting the single application registered for the notification type as the target application for a given device identifier comprises:
accessing priority information providing a priority value for each application registered for the notification type and associated with the given device identifier; and
selecting an application as the target application based on the priority values for the applications registered for the notification type and associated with the given device identifier.

8. A computerized method comprising:
identifying applications registered for an end user to receive notifications of a particular notification type;
grouping the applications by user device;
selecting a first group of applications associated with a first user device;
selecting a single target application from the first group of applications based on a function of usage information and a weighting value of the single target application; and communicating a first notification over a communications network to the target application at the first user device.

9. The method of claim 8, wherein the method further comprises:
receiving an originating notification at a notification server;
generating the first notification for the target application with a notification payload set to display a message; and
generating a second notification for each of the other applications from the first group of applications with a notification payload set not to display a message.

10. The method of claim 8, wherein identifying the applications registered for the end user to receive notifications of a particular notification type comprises:
identifying a group of applications associated with a user identifier for the end user; and
identifying, from the group of applications associated with the user identifier, a subset of applications registered for the notification type.

11. The method of claim 8, wherein selecting a target application from the first group of applications comprises:
accessing usage information for each application from the first group of applications;
identifying an application having the highest usage based on the usage information; and
setting the application having the highest usage as the target application.

12. The method of claim 8, wherein selecting a target application from the first group of applications comprises:
accessing usage information for each application from the first group of applications;
accessing priority information providing a weighting value for each application from the first group of applications;
calculating a priority value for each application from the first group of applications as a function of corresponding usage information and weighting value; and
selecting an application as the target application based on the priority values calculated for the applications from the first group of applications.

13. The method of claim 12, wherein the priority information provides weighting values irrespective of notification type.

14. The method of claim 12, wherein the priority information provides weighting values based on notification type.

15. The method of claim 8, wherein selecting a target application from the first group of applications comprises:
accessing priority information providing a priority value for each application from the first group of applications; and
selecting an application as the target application based on the priority values for the applications from the first group of applications.

16. A computer system comprising:
one or more processors; and
one or more computer storage media storing computer useable instructions that, when used by the one or more processors, cause the one or more processors to:
receive an originating notification of a particular notification type and addressed to a particular user identifier;
identify a set of applications registered to receive notifications of the particular notification type and associated with the particular user identifier, the set of applications being associated with a particular device identifier;
identify, from the set of applications, a subset of one or more applications as one or more target applications based on a function of usage information and weighting values of the one or more target applications;
generate a notification to each target application with a notification payload set to display a message; and
communicating the notifications to a user device associated with the particular device identifier.

17. The system of claim 16, wherein the one or more target applications are identified by looking up the one or more target applications from stored information.

18. The system of claim 16, wherein the one or more target applications are identified by:
accessing usage information for each application from the set of applications;
identifying one or more applications having the highest usage based on the usage information; and
setting the one or more applications having the highest usage as the one or more target applications.

19. The system of claim 16, wherein the one or more target applications are identified by:
accessing usage information for each application from set of applications;
accessing priority information providing a weighting value for each application from the set of applications;
calculating a priority value for each application from the set of applications as a function of corresponding usage information and weighting value; and
selecting one or more applications as the one or more target applications based on the priority values calculated for the applications from the set of applications.

20. The system of claim 16, wherein the one or more target applications are identified by:
accessing priority information providing a priority value for each application from the set of applications; and
selecting one or more applications as the one or more target applications based on the priority values for the applications from the set of applications.

* * * * *